US008465855B2

(12) United States Patent
Bradshaw et al.

(10) Patent No.: US 8,465,855 B2
(45) Date of Patent: Jun. 18, 2013

(54) PROTECTIVE COATING OF MAGNETIC NANOPARTICLES

(75) Inventors: Richard Lionel Bradshaw, Tucson, AZ (US); Dong-Chul Pyun, Tucson, AZ (US)

(73) Assignees: International Business Machines Corporation, Armonk, NY (US); Arizona Board of Regents on Behalf The University of Arizona, Tuscon, AZ (US)

( * ) Notice: Subject to any disclaimer, the term of this patent is extended or adjusted under 35 U.S.C. 154(b) by 0 days.

(21) Appl. No.: 12/174,605

(22) Filed: Jul. 16, 2008

(65) Prior Publication Data
US 2010/0015472 A1    Jan. 21, 2010

(51) Int. Cl.
*G11B 5/708* (2006.01)
(52) U.S. Cl.
USPC ............... 428/842.2; 252/62.51 R; 977/943
(58) Field of Classification Search
USPC ............................................. 428/800–848.9
See application file for complete search history.

(56) References Cited

U.S. PATENT DOCUMENTS

| | | | | |
|---|---|---|---|---|
| 4,163,823 A | * | 8/1979 | Legras et al. | 428/317.9 |
| 4,797,508 A | * | 1/1989 | Chant | 174/258 |
| 5,534,345 A | * | 7/1996 | Bradshaw | 428/323 |
| 6,254,662 B1 | | 7/2001 | Murray et al. | 75/348 |
| 6,302,940 B2 | | 10/2001 | Murray et al. | 75/348 |
| 6,548,264 B1 | | 4/2003 | Tan et al. | 435/7.21 |
| 6,676,729 B2 | | 1/2004 | Sun | 75/348 |
| 6,846,345 B1 | | 1/2005 | Keller et al. | 75/255 |
| 6,890,631 B2 | | 5/2005 | Bradshaw | 428/212 |
| 6,906,339 B2 | | 6/2005 | Dutta | 257/40 |
| 6,962,685 B2 | | 11/2005 | Sun | 423/632 |
| 6,974,492 B2 | | 12/2005 | Harutyunyan et al. | 75/351 |
| 6,974,493 B2 | | 12/2005 | Harutyunyan et al. | 75/362 |
| 6,991,741 B2 | | 1/2006 | Bullock et al. | 252/62.54 |
| 6,992,155 B2 | | 1/2006 | Okayama et al. | 526/183 |
| 7,029,514 B1 | | 4/2006 | Yang et al. | 75/348 |
| 7,081,489 B2 | | 7/2006 | Chen et al. | 523/200 |
| 7,128,891 B1 | | 10/2006 | Sun | 423/511 |

(Continued)

OTHER PUBLICATIONS

Gao et al. (A Facile Method of Forming Nanoscale Patterns on Poly(ethylene glycol)—Based Surfaces by Self-Assembly of Randomly Grafted Block Copolymer Brushes) 2008, Langmuir, 24, 8303-8308.*

(Continued)

*Primary Examiner* — Holly Rickman
*Assistant Examiner* — Linda Chau
(74) *Attorney, Agent, or Firm* — Alan S. Raynes; Konrad Raynes Davda & Victor LLP

(57) ABSTRACT

Encapsulated particles and methods for manufacturing encapsulated particles and structures are described. Such particles may have a length no greater than 40 nm, and include at least one material selected from the group consisting of ferromagnetic materials and ferrimagnetic materials. A polymeric encapsulant surrounds the particle, the polymeric encapsulant including a phase-separated block copolymer including a glassy first phase and a rubbery second phase, the glassy first phase positioned between the particle and the second rubbery phase. The glassy first phase includes a hydrophobic copolymer having a glass transition temperature of at least 50° C. The rubbery second phase includes a polymer having at least one of (i) a glass transition temperature of no greater than 30° C., and (ii) a tan delta peak maximum of no greater than 30° C. Other embodiments are described and claimed.

11 Claims, 3 Drawing Sheets

U.S. PATENT DOCUMENTS

| | | | |
|---|---|---|---|
| 2002/0010267 A1* | 1/2002 | Klaerner et al. | 525/91 |
| 2003/0118867 A1* | 6/2003 | Koda et al. | 428/694 T |
| 2005/0106421 A1* | 5/2005 | Kurose et al. | 428/694 BR |
| 2005/0238572 A1* | 10/2005 | Martin et al. | 423/626 |
| 2006/0111237 A1* | 5/2006 | Takayama et al. | 503/221 |
| 2009/0053512 A1 | 2/2009 | Pyun et al. | 428/336 |

OTHER PUBLICATIONS

Liao (Synthesis of Amphilic Diblock Copolymers via Living Polymerization and Benzoazole Contained Fluorescent Polymers) 2004, 100.*

Pyun, Nanocomposite Materials from Functional Polymers and Magnetic Colloids, Feb. 2007, Taylor &Francis , vol. 47, 231-263.*

Riess, Micellization of block copolymers, Jan. 2003, Prog. Polym. Sci, vol. 27, 1107-1170.*

Grubbs, Hybrid Metal-Polymer Composites from Functional Block Copolymers, May 2005, Wiley InterScience, 4323-4336.*

Korth et al., "Polymer Coated Ferromagnetic Colloids from Well-Defined Macromolecular Surfactants and Assembly into Nanoparticle Chains", J. Am. Chem. Soc., 2006, 128(20) pp. 6562-6563.

Pyun, viewgraphs for talk entitled "Polymer Coated Ferromagnetic Colloids: Novel Binder Materials", INSIC, Monterey, CA (Jul. 17, 2007).

Bradshaw, viewgraphs for talk entitled "Particulate Tape Coating Design", MINT Workshop, 2005.

* cited by examiner

PROTECTIVE COATING OF MAGNETIC NANOPARTICLES

FIELD OF THE INVENTION

The present invention relates to encapsulated particles and methods for manufacturing such particles and structures including such particles.

DESCRIPTION OF RELATED ART

Sub-micron sized magnetic metal particles suitable for forming a recording layer on a flexible magnetic medium or tape are commonly manufactured in sintered clusters of oxide coated metal particles. The oxide layer imparts chemical stability to the metal particles. The oxide layer also stabilizes the metal core, but reduces the volume fraction of the magnetic particle available to contribute to the magnetic domain which is needed to store information. The oxide layer is formed in a sintering process that also cements individual magnetic particles into clusters held together by the hard oxide material. This makes dispersion of the particles into the individual magnetic particles very difficult if not impossible. As a result, processing of these particles into suspensions suitable for creation of a useful recording layer on a flexible substrate is becoming increasingly difficult to achieve as the particles become smaller.

SUMMARY

One embodiment includes particles having a length no greater than 40 nm. The particles include at least one material selected from the group consisting of ferromagnetic materials and ferrimagnetic materials. A polymeric encapsulant surrounds the particle, the polymeric encapsulant including a phase-separated block copolymer including a glassy first phase and a rubbery second phase, the glassy first phase positioned between the particle and the second rubbery phase. The glassy first phase includes a hydrophobic copolymer having a glass transition temperature of at least 50° C. The rubbery second phase includes a polymer having at least one of (i) a glass transition temperature of no greater than 30° C., and (ii) a tan delta peak maximum of no greater than 30° C.

Another embodiment includes a magnetic tape comprising a plurality of encapsulated particles. The magnetic tape includes a plurality of magnetic particles, each having a length no greater than 40 nm. The magnetic particles each include at least one material selected from the group consisting of ferromagnetic materials and ferrimagnetic materials. There is a polymeric encapsulant surrounding the magnetic particles, the polymeric encapsulant including a phase-separated block copolymer including a glassy first phase and a rubbery second phase on each of the magnetic particles, the first phase positioned between the second phase and the magnetic particle. The glassy first phase includes a hydrophobic copolymer having a Tg of at least 50° C. The rubbery second phase includes a polymer having at least one of (i) a glass transition temperature of no greater than 30° C, and (ii) a tan delta peak maximum (as determined from dynamic mechanical analysis) of no greater than 30° C.

Another embodiment includes a method for manufacturing encapsulated particles. The method includes forming a first polymer on a magnetic particle, and performing ligand exchange to attach a second polymer to the first polymer, wherein the first polymer is positioned between the second polymer and the magnetic particle.

BRIEF DESCRIPTION OF THE DRAWINGS

Embodiments of the invention are described with reference to the accompanying drawings which, for illustrative purposes, are schematic and not necessarily drawn to scale.

DETAILED DESCRIPTION

While the invention is described in terms of the best mode for achieving this invention's objectives, it will be appreciated by those skilled in the art that variations may be accomplished in view of these teachings without deviating from the spirit or scope of the invention.

Certain embodiments relate to polymer encapsulated particles, with the encapsulant coating on the particles including a hard inner phase or shell region and a rubbery outer phase or shell region created from absorbed segments ordered on the particle surface. The hard inner shell region of the encapsulant coating on the particles is preferably formed to be hydrophobic and oxidation resistant, and includes unreacted side chains that form the secondary, more rubbery outer shell region that occupies the interface between the hard inner shell and a suspending solvent.

In as aspect of certain embodiments, free radical polymerizable monomers that yield glassy, hydrophobic polymer layers are used to construct the encapsulating layer. These polymers may have ionic end groups to promote absorption to the nanoparticles on one end or within the chain as well as a few functionalized co-monomers which may contain, for example, carboxyl, glycidyl, isocyanate, anhydride, amide, hydroxyl amine or nitrile functional groups. The functional group may be selected to provide preferential absorption on the nanoparticle surface. The polymerizable backbone of the monomer is preferably an aromatic or aliphatic hydrocarbon such that the resulting shell around the nanoparticle includes no polar functional groups or repeating units.

Figure 1:
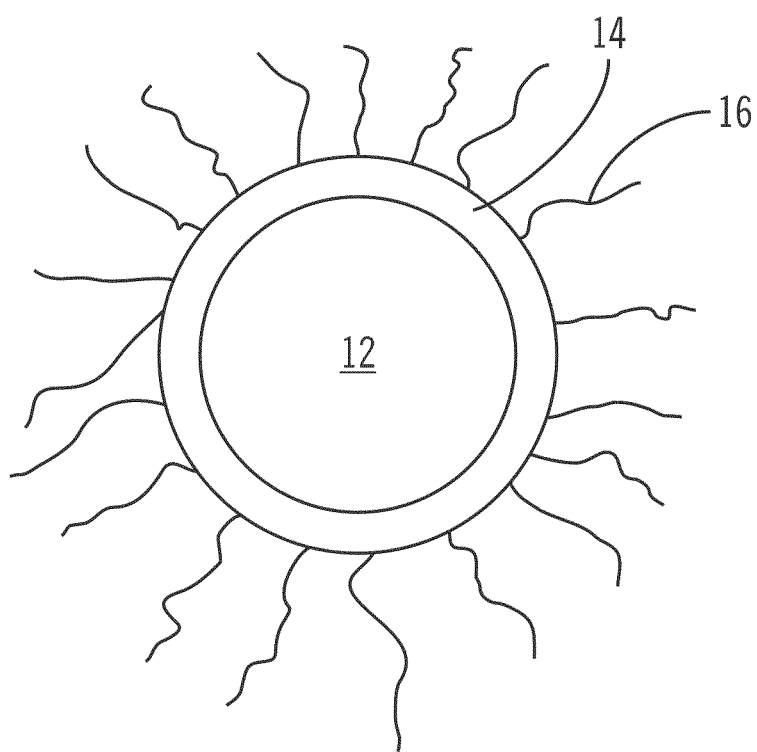
FIG. 1 illustrates a block copolymer core-shell particle including a particle core surrounded to an inner shell region and an outer shell region, in accordance with certain embodiments.

FIG. 1 illustrates an encapsulated particle including a particle 12 surrounded by an inner region 14 and an outer region 16, in accordance with certain embodiments. FIG. 1 is intended to illustrate the different phases (glassy and rubbery) present on the particle. The morphologies of the polymer inner region 14 and polymer outer region 16 may differ from that illustrated in the figures. The particle 12 may in certain embodiments have a diameter or a length dimension of about 40 nm or less. The particle 12 may be magnetic. By magnetic it is meant that the particle includes at least one material selected from the group including ferromagnetic materials and ferrimagnetic materials. Examples include iron (Fe), cobalt (Co) and alloys including Fe and/or Co, including, but not limited to iron-cobalt (Fe—Co) iron-barium (Fe—Ba), iron-nickel (Fe—Ni), barrium-ferrite (Ba—Fe), and cobalt-platinum (Co—Pt) alloys. Other examples include, but are not limited to, manganese-aluminum (Mn—Al) alloys, metal oxides (for ex., iron oxide, cobalt oxide, nickel oxide), and spinel ferrites.

The inner region 14 may include primarily a glassy first phase comprising a hydrophobic copolymer having a glass transition temperature (Tg) of greater than or equal to approximately 50° C. The outer region 16 may include primarily a rubbery second phase comprising a polymer having a glass transition temperature of less than or equal to approximately 30° C. and/or having a tan delta peak maximum of less than or equal to approximately 30° C.

The rubbery second phase of the outer region 16 may be formed to include a plurality of end groups comprising reactive functional groups. The reactive functional groups may include at least one of photoreactive functional groups or chemically reactive functional groups. Examples of photoreactively cured end groups include, but are not limited to azo functional groups, vinyl functional groups, allyl functional groups, and acryl functional groups. Examples of chemical reactively cured end groups include, but are not limited to, epoxy functional groups, isocyanate functional groups, anhydride functional groups, carboxylic acid functional groups, and alcohol functional groups.

In certain embodiments, the inner region 14 and the outer region 16 may have a combined thickness of no greater than 20 nm in the dry solid state. For embodiments related to magnetic tape applications, a combined thickness of no greater than 2 nm is preferred. Other embodiments may include a combined thickness of up to about 20 nm. The particle 12 may also include an oxide layer in certain embodiments. For particles including an oxide layer, the inner encapsulating region may be formed in direct contact with the oxide layer. In addition, in certain embodiments the particle may be acicular in morphology, with an aspect ratio of at least 2. Other embodiments may include particles that are more equiaxed in morphology. Generally, superior properties are obtained with acicular shaped particles.

An example of a process in accordance with certain embodiments is set forth below. In this example, polystyrene coated cobalt nanoparticles are formed in a first operation. A second operation includes an exchange of the polystyrene shell of the coated cobalt nanoparticles with a carboxylic acid copolymer, to form encapsulated nanoparticles having a glassy inner shell and a rubbery outer shell thereon.

The first operation of preparing polystyrene coated cobalt nanoparticles may be carried out as follows. To a three neck round bottom flask (250 ML, 14/20) with stir bar and condenser was added end-functional amine polystyrene (0.320 g, 0.064 mmol) and end-functional phosphine oxide polystyrene (0.080 g, 0.016 mmol) in dichlorobenzene (40 mL). The flask was flushed with argon for 10 minutes followed by heating to 180° C. using a thermocouple controlled heating mantle. A solution of dicobalt octacarbonyl (0.400 g, 1.17 mmol) in dichlorobenzne (8 mL) was injected into the hot solution over a period of 30 seconds. The evolution of a gas ($CO_2$) was observed, indicating that a reaction was proceeding. The reaction was heated at 160° C. for 30 minutes and was cooled to room temperature with continuous stirring under argon.

The collected reaction mixture was then precipitated into stirring hexanes (500 mL). The precipitate was collected by sedimentation using a standard AlNiCo magnet followed by decanting of the hexanes phase. The resulting precipitate was then dried in vacuo to give a black powder (yield: 0.250 g) that was soluble in a wide range of non-polar solvents (e.g. toluene, THF, $CH_2Cl_2$) and was responsive to an external magnetic field. The black powder includes magnetic cobalt nanoparticles having a polymer coating including a polystryrene shell.

The second operation of exchange of the original polystyrene shell of the polymer coated cobalt nanoparticles with a carboxylic acid polymer may be carried out as follows. The carboxylic polymer used in this example was poly(methyl methacrylate). To a round bottom flask with stir bar was added the polystyrene coated cobalt nanoparticles (0.0620 g), and poly(methyl methacrylate) (0.1275 g), dissolved in toluene (15 mL). The solution was heated at 50° C. under argon for 48 hours. The reaction solution was concentrated in a vacuum to a volume of 2 mL followed by centrifugation (5000 rpm, 60 minutes), to yield a black pellet (0.0702 g) after decanting of supernatant and air drying. To a scint vial with stir bar, the recovered pellet (0.0292 g) was dissolved in dichloromethane (5 mL), followed by the gradual addition of Aliquot 336 (0.050 g) and HCl (0.75 mL). The solution was stirred for approximately 1 hour at which point the reaction product becomes biphasic with a light blue organic layer. The organic layer was removed and passed through a plug of neutral alumina to remove the cobalt complex followed by concentration and preparation for SEC and NMR characterization. The final cobalt complex produce may be stored in a liquid medium or stored in a dry condition in a suitable container.

It should be appreciated that methods for ligand exchange may incorporate the use of THF as the solvent for the polymer and polymer coated colloids with sonication at power level 5 for 180 minutes. The solution is then concentrated and centrifuged to yield a pellet that is dissolved by using a 2:1 mixture of glacial acetic acid and dichloromethane.

The cobalt complex obtained in the above process includes a polymeric encapsulated magnetic nanoparticle particle having a hard inner shell and a more rubbery outer shell. The inner shell formed a glass-like region around the cobalt nanoparticle core. The outer rubbery shell may bind to binder materials for reinforcement and for mechanical energy dissipation. It will be appreciated by one of ordinary skill that a variety of particles other than cobalt may be used as the core particle material, and that a variety of polymers may be used in the exchange process for forming the hard inner shell and the rubbery outer shell regions on the particles.

Some examples of specific block polymers that may be used in the exchange operation include, but are not limited to, (i) poly(methyl methacrylate)-block-poly(oligoethylene glycol) methacrylate; (ii) polystyrene-block-poly(butyl acrylate); and (iii) polymethyl methacrylate-block-poly(ethylene oxide). The chemical structures for these block polymers is set forth in Table 1 below. For poly(methyl methacrylate)-block-poly(oligoethylene glycol) methacrylate, the poly(m-ethyl methacrylate) will form the hard inner shell on the particles, and the ethylene glycol will form the rubbery outer shell. For polystyrene-block-poly(butyl acrylate), the polystyrene will form the hard inner shell on the particles, and the butyl acrylate will form the rubbery outer shell. For poly (methyl methacrylate)-block-poly(ethylene oxide), the poly (methyl methacrylate) will form the hard inner shell on the particles, and the ethylene oxide will form the rubbery outer shell.

TABLE 1

Chemical name and structure for certain exchange polymers.

| Name | Chemical Structure |
|---|---|
| Poly(methyl methacrylate)-block-poly-(oligo-ethylene glycol) methacrylate | [structure shown] |
| Polystyrene-block-poly-(butyl acrylate) | [structure shown] |

TABLE 1-continued

Chemical name and structure for certain exchange polymers.

| Name | Chemical Structure |
|---|---|
| Poly(methyl methacrylate)-block-poly-(ethylene oxide) | $\text{--}[\text{CH}_2\text{--}\underset{\underset{\underset{\text{CH}_3}{|}}{\underset{\text{O}}{|}}}{\overset{\overset{\text{CH}_3}{|}}{\text{C}}}]_m\text{--}\underset{\underset{\text{=O CH}_3}{|}}{\overset{\overset{\text{CH}_3 O}{| \ ||}}{\text{C}\text{--}\text{C}}}\text{--}[\text{O}\text{--}\text{CH}_2\text{--}\text{CH}_2]_n\text{--}\text{OH}$ |

Figure 2:
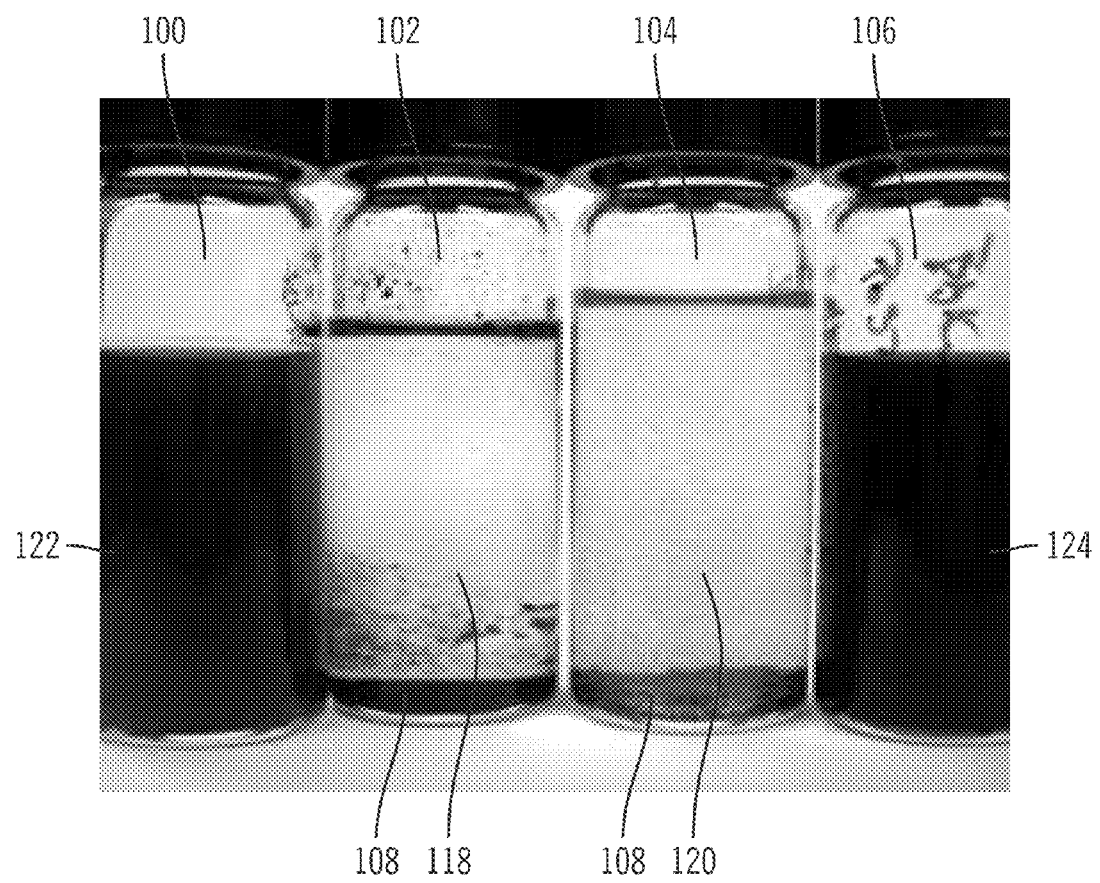
FIG. 2 illustrates a comparison of dispersion properties of encapsulated particles in a variety of solvents.

Encapsulated nanoparticles such as those described above may be used to form devices such as magnetic tape. The nanoparticles can be tailored to have good properties for forming tapes. To form a tape the encapsulated particles are dispersed in a solvent and mixed with various other materials such as lubricants, curing materials, and the like. FIG. 2 illustrates an evaluation of the solubility (dispersability) of certain encapsulated nanoparticles in polar and non-polar solvents. FIG. 2 includes cobalt nanoparticles including either (i) a glassy polymer layer alone (one phase encapsulated particles), or (ii) a glassy polymer layer and a rubbery phase polymer layer formed on the glassy polymer layer (two phase encapsulated particles). The nanoparticles are placed into vials including either a polar solvent or a non-polar solvent, in order to investigate the solubility of the nanoparticles in various solvents.

Vials 100 and 102 contain a non-polar solvent, hexane. Vials 104 and 106 contain a polar solvent, methanol. Vials 102 and 104 include the encapsulated cobalt nanoparticles having a glassy polymer layer formed from poly(methyl methacrylate) (PMMA).

The encapsulated particles 108 appear to be mostly settled at the bottom of vials 102 and 104, which contain the non-polar solvent hexane and the polar solvent methanol, respectively. This indicates that the PMMA coated particles do not disperse well in either the non-polar solvent hexane 118 or in the polar solvent methanol 120. A different result is obtained for encapsulated particles that are modified by the addition of a rubbery layer with appropriate polar or non-polar solvent affinity. Vials 100 and 106 show stable dispersions 122 and 124 of particles in the solvent materials. Specifically, dispersion 122 includes the cobalt nanoparticles having a PMMA glassy layer and a poly(oligoethylene glycol methacrylate) layer grafted thereon, in a non-polar hexane solvent. Dispersion 124 includes the cobalt nanoparticles having a PMMA glassy layer and a poly(oligoethylene glycol methacrylate) layer grafted thereon, in a polar methanol solvent. The presence of the dark particles throughout the solvent in the dispersions 122 and 124 indicates that the encapsulated nanoparticles can be successfully dispersed is a variety of solvents when certain outer rubbery phase materials are formed on the glassy phase.

A tape containing particles encapsulated with a two phase structure such as described above, with a hard inner region and a rubbery outer region surrounding the particle, may be formed using a variety of techniques, including, but not limited to, coating from polar or non-polar solvents and subsequent cure by use of either chemical condensation polymerization or free radical polymerization. The encapsulated particles such as those described above are formed to include the appropriate reactive groups so that polymerization can be carried out.

Reactive groups for condensation polymerization include, but are not limited to, amines, alcohols, acids, epoxies, nitriles, mercaptans, thiols, acid chlorides, isocyanates, halides, Mannich bases, aziridines and moieties using metal complexes (Lewis acids). Suitable mixtures of isocyanates (—NCO group) may be used to cure tape formulations. These are reacted with end groups on the binders to attempt to improve the coating properties. Isocyanates are reacted with amines and primary alcohols to form amide bonds (—CO—NH—) analogous to the ester bond formed from carboxylic acids and alcohols.

Reactive groups for free radical polymerization include, but are not limited to, vinyl, styryl, acryl, allyl and other functional groups sensitive to forming very reactive free radicals upon excitation, by thermal decomposition or irradiation by e-beam or UV light.

Suitable solvent materials, binders, cross-linking additives, etc., are used to ensure proper viscosity and rheology (for example, thixotropic) during the formation process. In certain embodiments, the polymer encapsulated particles are deposited in solution onto a moving carrier and cured and set through a suitable evaporation and heating process, to form the tape.

Figure 3:
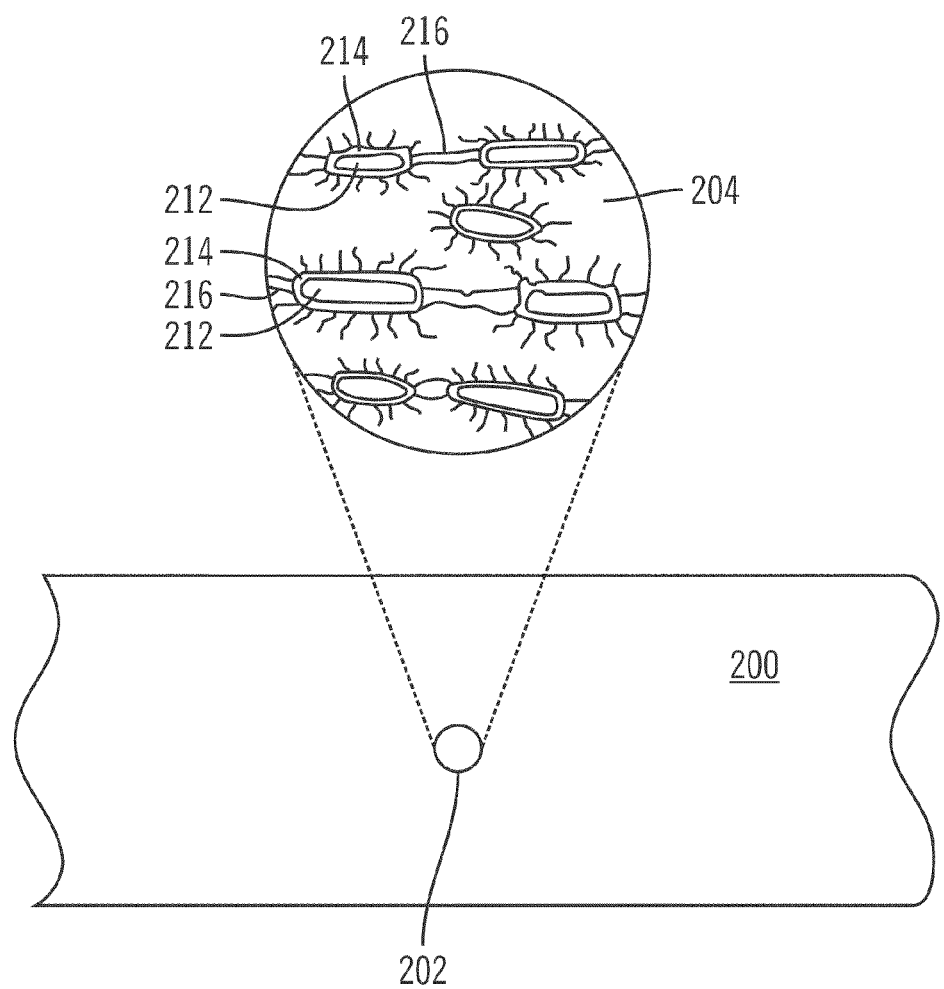
FIG. 3 illustrates a tape in accordance with certain embodiments.

The structure of the tape may in certain embodiments resemble a very fine, tight array of substantially parallel strings along the tape length direction. The embodiment illustrated in FIG. 3 shows a blown up view of region 202 on tape 200, including several rows of particles 212 having encapsulating layers 214 and 216, with the layer 214 being a glassy phase and the layer 216 being a rubbery phase, similar to those described above. In this embodiment, the particles 212 are somewhat acicular in morphology. End groups on portions of the rubbery phase 216 extending outward from the particle 212 and layer 214 have reacted with other end groups from other rubbery phase 216 regions from other particles during the polymerization process. Regions between the particles may include matrix material 204 (for example, a polymer matrix). Structures having different particle layouts than that shown in FIG. 3 may also be formed.

It will, of course, be understood that modifications of the present invention, in its various aspects, will be apparent to those skilled in the art. Additional embodiments are possible, their specific features depending upon the particular application. For example, a variety of materials and processes may be used in various embodiments. For instance, certain embodiments utilize magnetic nanoparticles, but other embodiments may relate to encapsulation of non-magnetic particles, both nanosized and larger.

What is claimed is:

1. An encapsulated particle comprising:
   a particle having a length no greater than 40 nm;
   the particle comprising at least one material selected from the group consisting of ferromagnetic materials and ferrimagnetic materials; and
   a polymeric encapsulant surrounding the particle, the polymeric encapsulant comprising a block copolymer comprising poly(methyl methacrylate)-block poly(oligoethylene glycol) methacrylate.

2. The encapsulated particle of claim 1,
   wherein the polymeric encapsulant has a thickness of up to 2 nm.

3. The encapsulated particle of claim 1, wherein the block copolymer is configured as a glassy inner shell and a rubbery outer shell on the particle;
   the glassy inner shell comprising a hydrophobic copolymer having a glass transition temperature of at least 50° C.;
   the rubbery outer shell comprising a polymer having at least one of (i) a glass transition temperature of no greater than 30° C., and (ii) a tan delta peak maximum of no greater than 30° C.;
   wherein the glassy inner shell is in direct contact with the particle; and
   wherein the glassy inner shell surrounds the particle in a continuous manner.

4. The encapsulated particle of claim 1, wherein the particle comprises a material selected from the group consisting of iron cobalt alloys, cobalt platinum alloys, barium ferrite alloys, cobalt, nickel iron alloys, manganese aluminum alloys, iron nickel alloys, iron, iron oxide, cobalt oxide, nickel oxide, and spinel ferrites.

5. The encapsulated particle of claim 1, wherein the block copolymer is configured as a glassy inner shell and a rubbery outer shell on the particle, wherein the glassy inner shell includes an inner surface facing towards the particle and an outer surface opposite the inner surface and facing away from the particle, the inner surface being in direct contact with the particle, the rubbery outer shell being in direct contact with the outer surface.

6. The encapsulated particle of claim 1, wherein the particle has a length dimension of no greater than 20 nm.

7. The encapsulated particle of claim 1, wherein the particle includes an oxide layer, and wherein the polymeric encapsulant is formed in contact with the oxide layer.

8. A magnetic tape comprising a plurality of encapsulated particles, comprising:
 a plurality of magnetic particles, each having a length no greater than 40 nm;
 the magnetic particles each comprising at one material selected from the group consisting of ferromagnetic materials and ferrimagnetic materials; and
 a polymeric encapsulant surrounding the magnetic particles, the polymeric encapsulant comprising a block copolymer comprising poly(methyl methacrylate)-block poly(oligoethylene glycol) methacrylate.

9. The magnetic tape of claim 8,
 wherein the polymeric encapsulant has a thickness of up to 2 nm.

10. The magnetic tape of claim 8, wherein the block copolymer is configured as a glassy inner shell and a rubbery outer shell on the particle;
 the glassy inner shell comprising a hydrophobic copolymer having a glass transition temperature of at least 50° C.; and
 the rubbery outer shell comprising a polymer having at least one of (i) a glass transition temperature of no greater than 30° C., and (ii) a tan delta peak maximum of no greater than 30° C.

11. The magnetic tape of claim 8, further comprising a polymer matrix material between adjacent magnetic particles and between the polymeric encapsulant surrounding each of the adjacent magnetic particles.

* * * * *